United States Patent
Kudrna et al.

(10) Patent No.: US 10,777,916 B2
(45) Date of Patent: Sep. 15, 2020

(54) GASKET

(71) Applicant: PRATT & WHITNEY CANADA CORP., Longueuil (CA)

(72) Inventors: Richard Robert Kudrna, Carignan (CA); Benjamin James Renaud, Montreal (CA); Pierre Huppe, Lemoyne (CA)

(73) Assignee: PRATT & WHITNET CANADA LLP, Longueuil (CA)

( * ) Notice: Subject to any disclaimer, the term of this patent is extended or adjusted under 35 U.S.C. 154(b) by 0 days.

(21) Appl. No.: 16/278,790

(22) Filed: Feb. 19, 2019

(65) Prior Publication Data
US 2020/0266560 A1  Aug. 20, 2020

(51) Int. Cl.
*H01R 9/18*  (2006.01)
*H01R 4/34*  (2006.01)
*H01R 4/56*  (2006.01)

(52) U.S. Cl.
CPC ............... *H01R 9/18* (2013.01); *H01R 4/34* (2013.01); *H01R 4/56* (2013.01)

(58) Field of Classification Search
CPC ...... F16B 5/01; F16B 2001/0064; H01R 4/64; H01R 4/34; H01R 4/56; H01R 9/18
USPC .......................................... 439/92–108, 927
See application file for complete search history.

(56) References Cited

U.S. PATENT DOCUMENTS

| | | | |
|---|---|---|---|
| 3,301,121 A * | 1/1967 | Newcomer | A47K 13/26 411/368 |
| 4,213,718 A * | 7/1980 | Lumby | B60G 7/02 248/635 |
| 5,453,027 A | 9/1995 | Buell et al. | |
| 5,524,908 A * | 6/1996 | Reis | H05K 9/0015 174/358 |
| 6,114,629 A * | 9/2000 | Roush | H02G 3/22 16/2.1 |
| 6,142,483 A * | 11/2000 | Bryant, III | F16J 15/122 277/598 |
| 6,720,494 B1 * | 4/2004 | Norte | H05K 9/0015 174/388 |
| 9,703,109 B2 * | 7/2017 | Lee | G02B 27/26 |
| 10,003,113 B1 | 6/2018 | Salinas | |
| 10,212,864 B1 * | 2/2019 | Roath | F16J 15/128 |
| 2005/0067037 A1 * | 3/2005 | Salama | E21B 17/01 138/143 |
| 2006/0220324 A1 | 10/2006 | Anderson et al. | |

OTHER PUBLICATIONS

EMI & Environmental Connector-Seal (Front-Mount), pp. 25-26, www.spira-emi.com, accessed on Feb. 13, 2019.
Spira's Connector-Seal Gaskets, p. 21, www.spira-emi.com, accessed on Feb. 13, 2019.

* cited by examiner

*Primary Examiner* — Gary F Paumen
(74) *Attorney, Agent, or Firm* — Norton Rose Fulbright Canada LLP

(57) ABSTRACT

A gasket providing electrical conductivity between components is disclosed. The gasket comprises a body having a fastener hole extending therethrough and an electrically conductive insert lining at least part of the fastener hole in the body. The insert has a first contact face disposed for electrically contacting a first component and a second contact face disposed for electrically contacting a second component. The first contact face is in electrical communication with the second contact face.

18 Claims, 6 Drawing Sheets

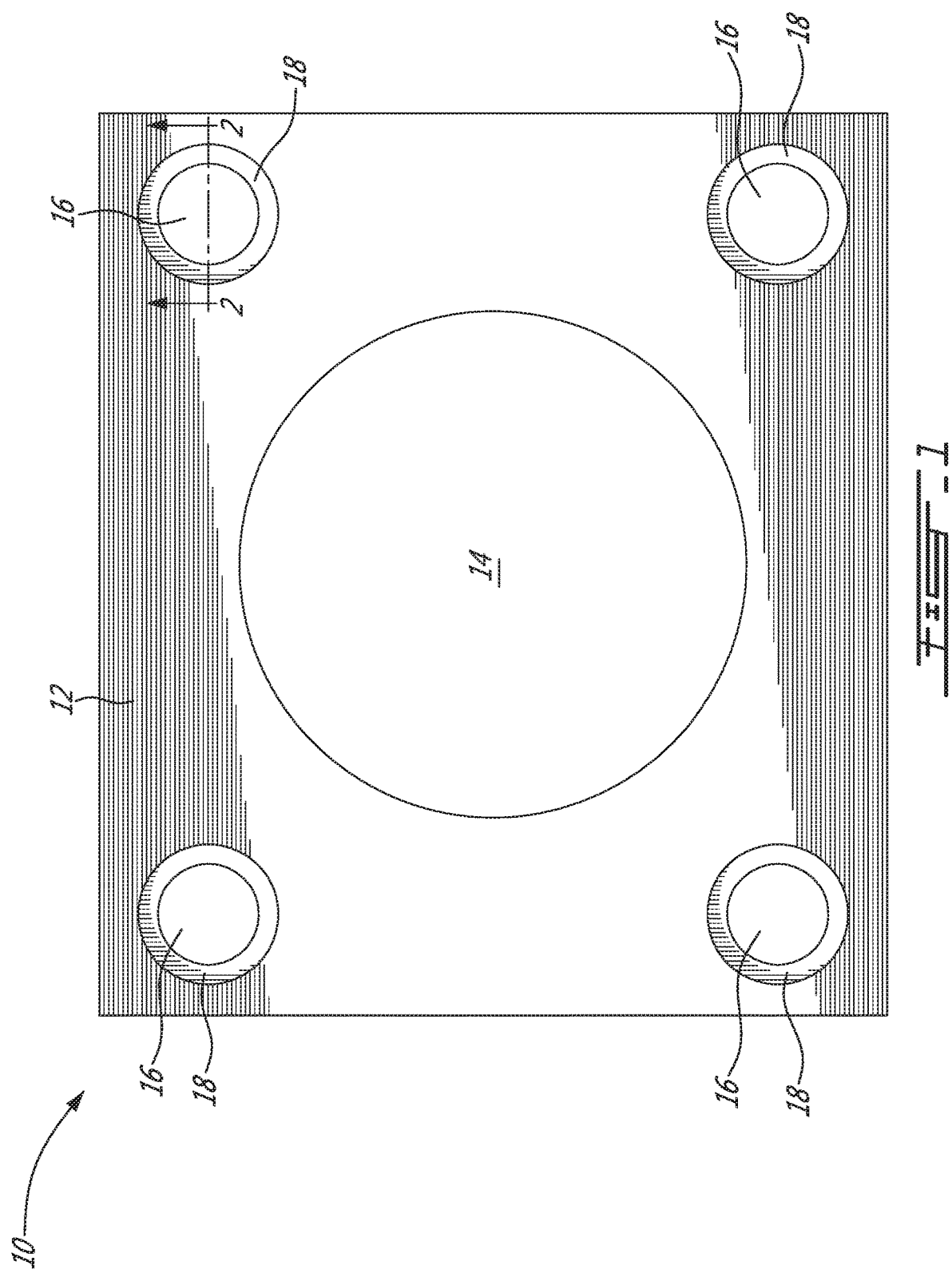

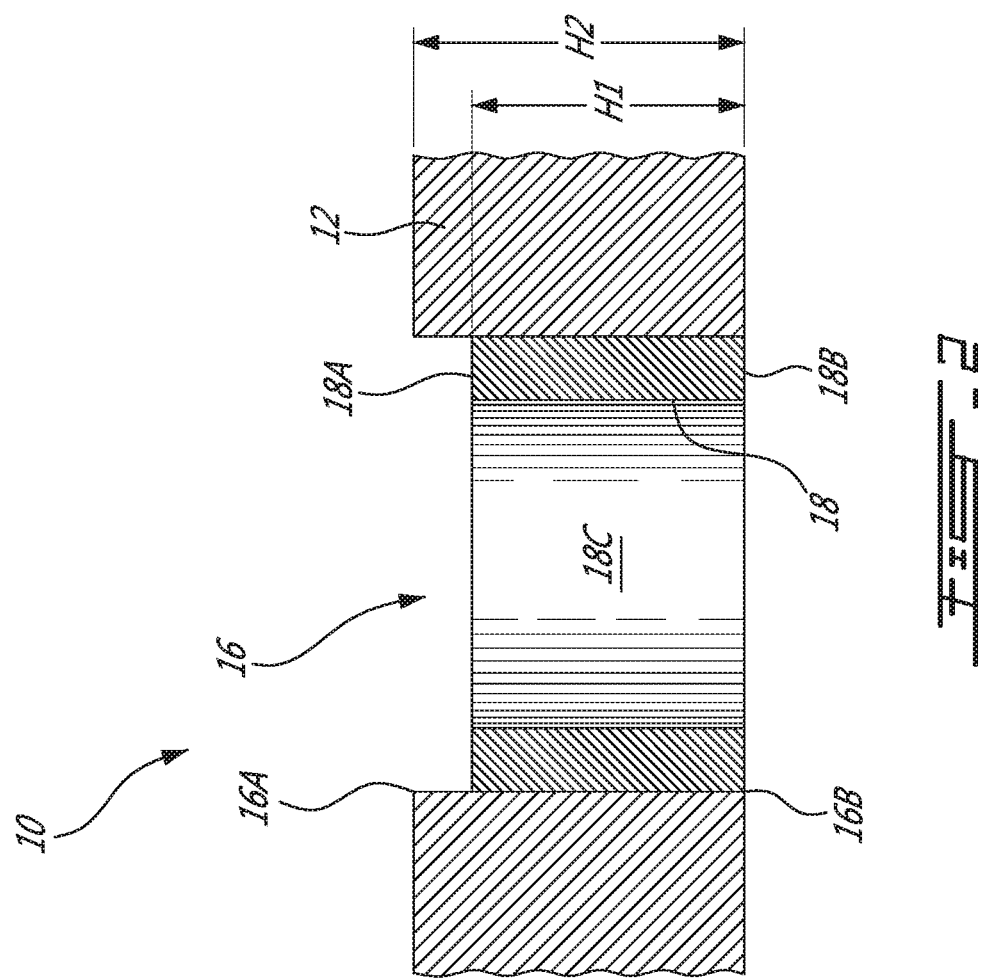

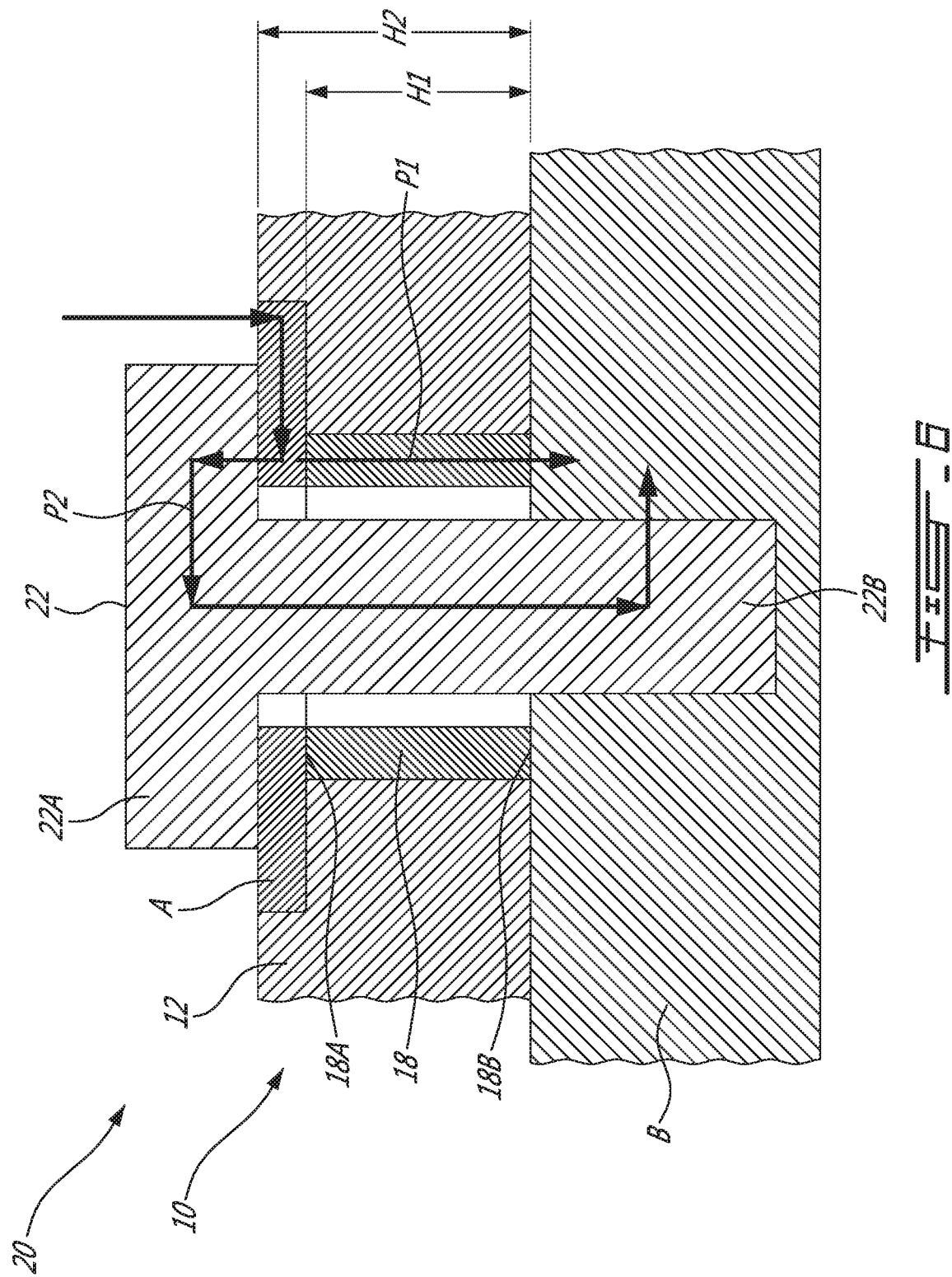

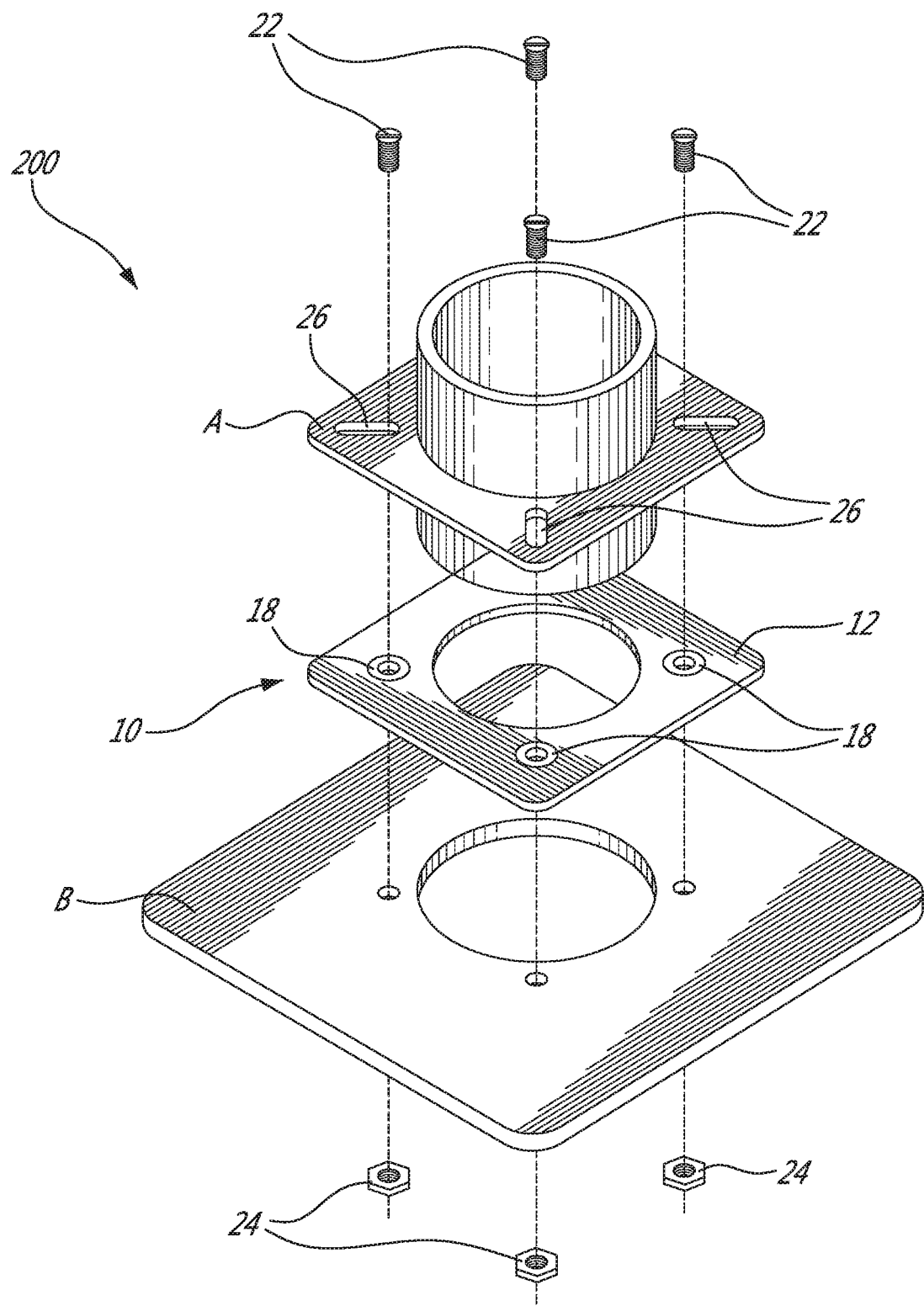

GASKET

TECHNICAL FIELD

The disclosure relates generally to gaskets.

BACKGROUND

In some installations, it is desirable to provide electrical conductivity across gaskets. Some gaskets include a metallic mesh embedded within a soft gasket material to provide an electrical path across a joint once assembled. However, in some instances where the gasket is disposed in a bolted joint, the preload on the bolt can cause the gasket material to deform and migrate away from the bolt head or other contact surface and such deformation can reduce the effectiveness of the electrical path. Improvement is desirable.

SUMMARY

In one aspect, the disclosure describes a gasket for installation between a first and a second component. The gasket comprises:
a body having a fastener hole extending therethrough; and
an electrically conductive insert lining at least part of the fastener hole in the body, the insert having:
a first contact face disposed for electrically contacting the first component; and
a second contact face disposed for electrically contacting the second component, the first contact face being in electrical communication with the second contact face.

The first contact face may be annular. The second contact face may be annular.

The first contact face may define at least a majority of an annulus.

The insert may define an annular electrically conductive path extending between the first and second contact faces.

The fastener hole may have a hole height corresponding to a thickness of the body in an uncompressed state. The insert may have an insert height along the fastener hole of the body. The hole height may be greater than the insert height.

The insert may be more rigid than the body.

The body may be electrically conductive.

The body may be overmolded to the insert.

The insert may be metallic.

The first contact face may be sunk below a first opening of the fastener hole in the body. The second contact face may be substantially flush with a second opening of the fastener hole in the body.

The insert may be more electrically conductive than the body.

The insert may have a cross-sectional profiled that is uniform between the first contact face and the second contact face.

Embodiments can include combinations of the above features.

In another aspect, the disclosure describes an assembly comprising:
a first component;
a second component; and
a gasket disposed between the first and second components, the gasket having:
a body having a fastener hole extending therethrough; and
an electrically conductive insert lining at least part of the fastener hole in the body, the insert having:
a first contact face electrically contacting the first component; and
a second contact face electrically contacting the second component, the first contact face being in electrical communication with the second contact face.

The insert may define an annular electrically conductive path extending between the first and second contact faces.

The fastener hole may have a hole height corresponding to a thickness of the body in an uncompressed state. The insert may have an insert height along the fastener hole of the body. The hole height may be greater than the insert height.

The insert may be more rigid than the body.

The body may be electrically conductive.

The assembly may comprise a fastener securing the first and second components together. The fastener may extend through the fastener hole of the body. A head of the fastener may be in electrical contact with the first component. The first component may be in electrical contact with the insert. The insert may be in electrical contact with the second component.

The first contact face may be annular. The second contact face may be annular.

The first component may be an electrical receptacle.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 1 is a top plan view of an exemplary gasket as described herein;

FIG. 2 is a schematic cross-sectional view of the gasket of FIG. 1 taken along line 2-2 in FIG. 1;

FIG. 6 is a schematic cross-sectional view of an exemplary assembly including the gasket of FIG. 1; and FIG. 7 is a perspective exploded view of another exemplary assembly including the gasket of FIG. 1.

DETAILED DESCRIPTION

Figure 4:
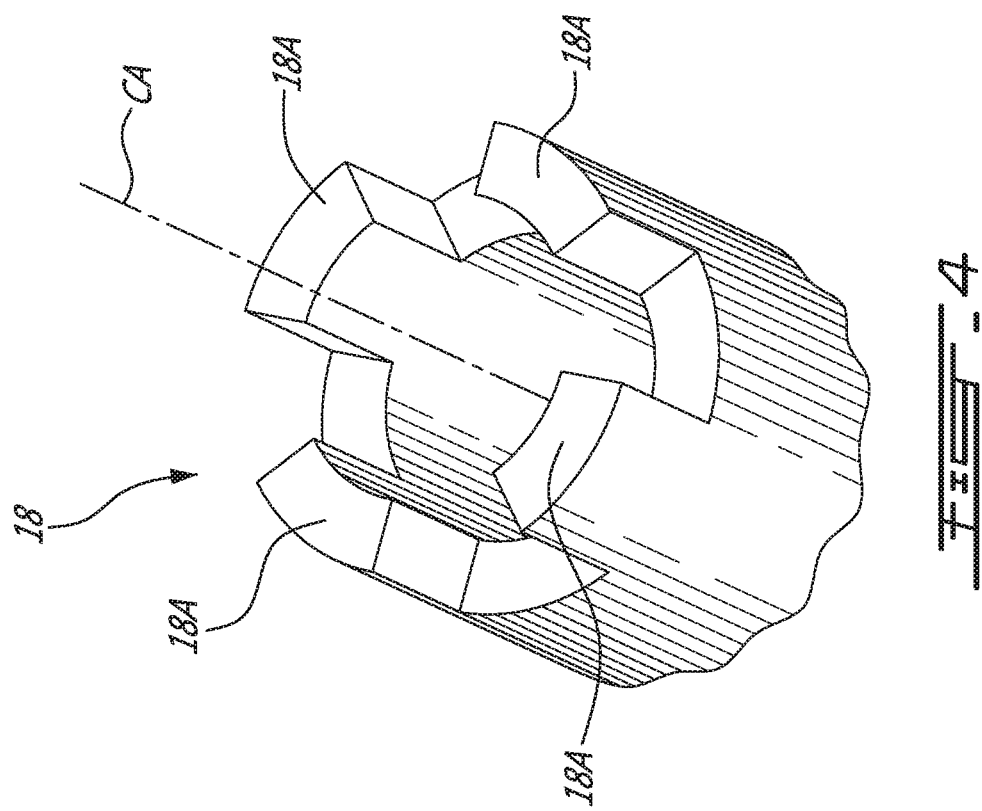
FIG. 4 is a perspective view of another exemplary insert of the gasket of FIG. 1.

The following disclosure describes a gasket construction that can provide a relatively robust electrical path across a gasket. Relative to existing conductive gaskets on the market, this arrangement can, in some embodiments, provide one or more of the following advantages: better ampacity (ability to handle large currents such as lightning induced currents); improved durability against corrosive environments; better tolerance to vibration induced loads such as between an electrical harness and plug and an electrical receptacle mated to a component using the gasket described herein; reduced reactance against high frequency currents; and better ability to retain the above properties after being exposed to temperature cycling, vibration, mechanical shock, and corrosive environments. In some embodiments, the gasket construction disclosed herein can also prevent or reduce the risk of over-compression and unwanted deformation of compressible gasket material during installation of the gasket. Aspects of various embodiments are described through reference to the drawings.

FIG. 1 is a top plan view of an exemplary gasket 10 as described herein. Gasket 10 may be configured to be installed between two components that are joined together. In some embodiments, gasket 10 can be used to make a (e.g., fluid-tight) seal between the two components. Gasket 10 can be a mechanical seal that fills the space between two or more mating surfaces to prevent leakage out of or into the joined components while under compression. Gasket 10 can include body 12 made of a suitable (e.g., compressible) body material. Gasket 10 can include one or more through main openings 14 formed therein. Main opening 14 can be configured to accommodate a cavity that may be cooperatively defined by the two components between which gasket 10 is installed. Accordingly, gasket 10 can be configured to be compressed and serve as an interface between the two components.

Body 12 of gasket 10 can have a material composition that is compressible and which can be different in different applications. Aspects of this disclosure are applicable to gaskets 10 having bodies of various materials and shapes. By way of non-limiting examples, body 12 can be made of an elastomer (e.g., rubber), silicone, metal, cork, felt, neoprene, nitrile rubber, fiberglass, polytetrafluoroethylene (PTFE), polyimide, or a plastic polymer such as polychlorotrifluoroethylene (PCTFE). In some embodiments, the material of body 12 can be electrically conductive, partially electrically conductive or non-electrically conductive. For example, body 12 can comprise a conductive (e.g., metallic) wire mesh or conductive (e.g., metallic) particles embedded within a (e.g., relatively soft) base gasket material to provide electrical conductivity to the base gasket material that is non-conductive or that has a low electrical conductivity. In some embodiments, body 12 can be electroplated with an electrically conductive material so that body 12 can be electrically conductive.

Body 12 can have one or more fastener holes 16 (referred hereinafter in the singular) extending therethrough. Fastener hole 16 can be positioned and sized to accommodate the passage of a fastener (shown in FIG. 4) through body 12. Fastener hole 16 can be at least partially lined by insert 18. Insert 18 can have a material composition that is different from the material composition of body 12. For example, insert 18 can be made of a material that is more electrically conductive and more rigid (i.e., is stiffer and has a higher Young's modulus) than the material of body 12. Insert 18 can be made of a metallic material having a relatively high electrical conductivity such as steel, a copper-based material or an aluminum-based material for example. Insert 18 can be made of a material that has suitable properties for the bolted joint and suitable electrical conductivity. The material chosen for insert 18 should also be corrosion compatible with the system with which it is installed. Insert 18 can have an electrically-conductive coating disposed thereon. In some embodiments, insert 18 can be made from nickel-plated brass. In some embodiments, insert 18 can be a chromated aluminum body.

Insert 18 can be integrated into gasket 10 by any suitable means. In some embodiments, insert 18 can be integrated into gasket 10 by way of an overmolding process where the material of body 12 is overmolded onto insert 18. In some embodiments, insert 18 can be retained inside fastener hole 16 by way of an interference fit between an outer surface of insert 18 and fastener hole 16. In some embodiments, insert 18 can be retained inside fastener hole 16 by way of an adhesive disposed between insert 18 and fastener hole 16. It is understood that in some embodiments, insert 18 does not need to be structurally integrated with gasket 10. For example, insert 18 could be inserted as a separate component into fastener hole 16 prior to installation of gasket 10.

FIG. 2 is a schematic cross-sectional view of gasket 12 taken along line 2-2 in FIG. 1. FIG. 2 shows a portion of gasket 12 in an uncompressed state corresponding to when gasket 12 is not in use (e.g., not installed and compressed between two components).

Figure 3:
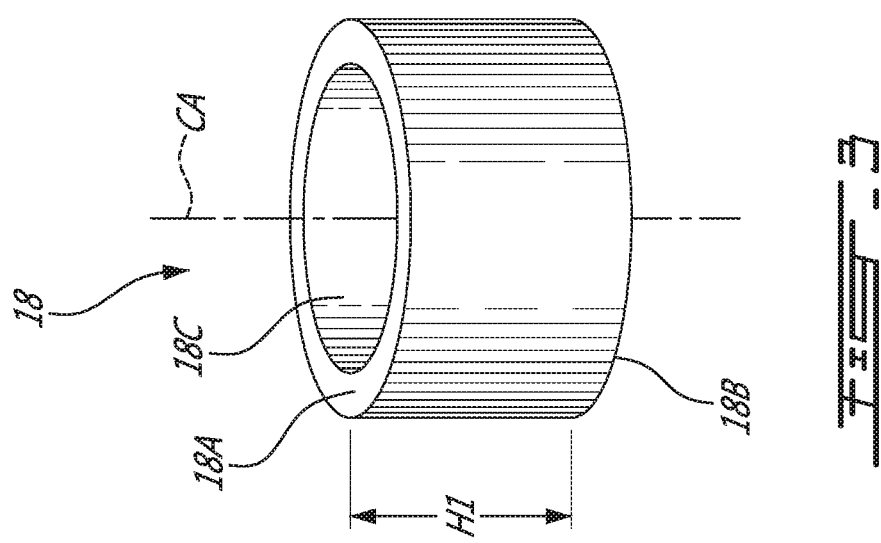
FIG. 3 is a perspective view of an exemplary insert of the gasket of FIG. 1.

FIG. 3 is a perspective view of an exemplary insert 18 of gasket 10.

Other existing gaskets attempt to provide electrical conductivity by the use of carbon, metal dust or fine filament impregnated organic materials. These existing designs can suffer from corrosion susceptibility due to galvanic incompatibility of the materials of the gasket (e.g., carbon being more cathodic than metals), or, poor ampacity and conductivity where the gasket will not sink away a sufficient amount of current or will overheat and be damaged when subjected to significant electrical potential. Accordingly, such existing gaskets may be suitable for handling some static discharge but not suitable for relatively high intensity radiated field (HIRF) dissipation or lightning strike protection.

In reference to FIGS. 2 and 3, insert 18 of gasket 10 can have a sleeve or ferrule configuration made of an electrically conductive (e.g., metallic) material. Insert 18 can have: first contact face 18A (surface) disposed for electrically contacting a component disposed on a first side of gasket 10; and second contact face 18B (surface) disposed for electrically contacting a component disposed on an opposite second side of gasket 10. For example, insert 18 can have a tubular configuration where first and second contact faces 18A and 18B are disposed at opposite ends of insert 18. Accordingly, first and second contact faces 18A and 18B can be annular.

First and second contact faces 18A and 18B can be in electrical communication with each other via the electrically conductive body of insert 18. The tubular body of insert 18 can define an annular electrically conductive path extending between first and second contact faces 18A, 18B. Insert 18 can have a dimension (e.g., height) H1 separating first and second contact faces 18A and 18B. In some embodiments, an annular cross-sectional profile normal to central axis CA of insert 18 can be substantially uniform along the dimension H1 of insert 18. Insert 18 can have (e.g., cylindrical) passage 18C extending therethrough along and optionally coaxial with central axis CA for receiving the fastener.

Fastener hole 16 in body 12 can have a hole height (or depth) H2 corresponding to a thickness of body 12 in an uncompressed state. Height H2 of fastener hole 16 can be greater than height H1 of insert 18. In some embodiments, first contact face 18A can be sunk below first opening 16A of fastener hole 16 defined on the first side of body 12. Second contact face 18B can be substantially flush with second opening 16B of fastener hole 16 defined on the opposite second side of body 12.

FIG. 4 is a perspective view of another exemplary insert 18 of gasket 10. FIG. 4 shows an exemplary configuration of contact faces 18A at a first end of insert 18 but it is understood that the opposite end of insert 18 could have an identical or a different configuration of contact faces 18B. In some embodiments, contact faces 18A and 18B do not have to be completely annular. In some embodiments, one or both ends of insert 18 can be castellated in order to define a plurality of contact faces 18A and optionally a plurality of contact faces 18B.

Figure 5A:
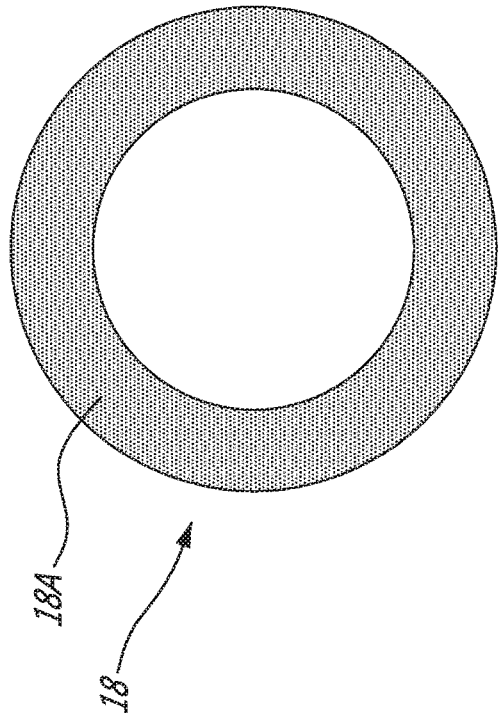
FIGS. 5A-5D are top views of exemplary inserts of the gasket of FIG. 1 showing different configurations of contact faces.
Figure 5B:
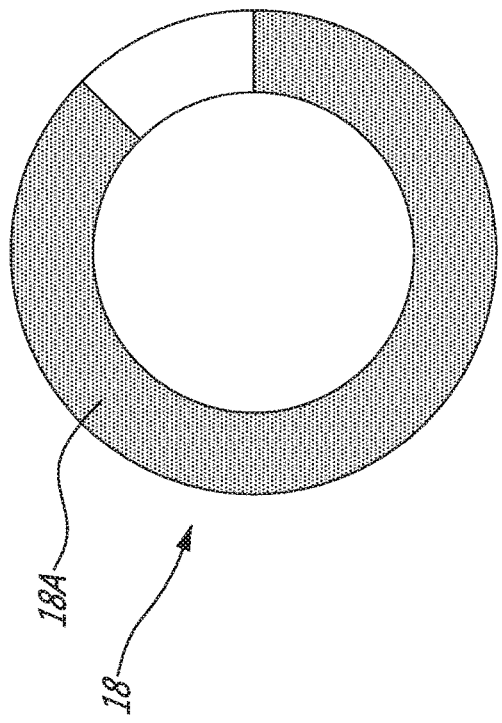
Figure 5C:
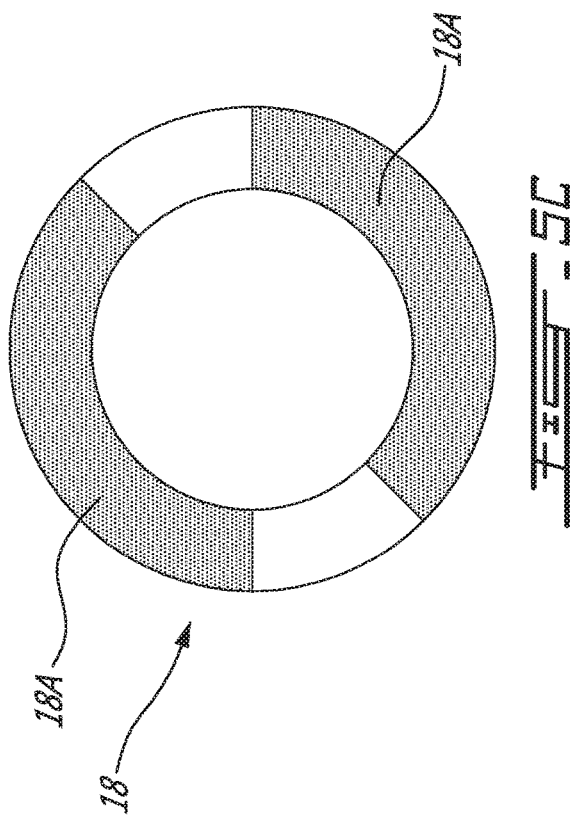
Figure 5D:
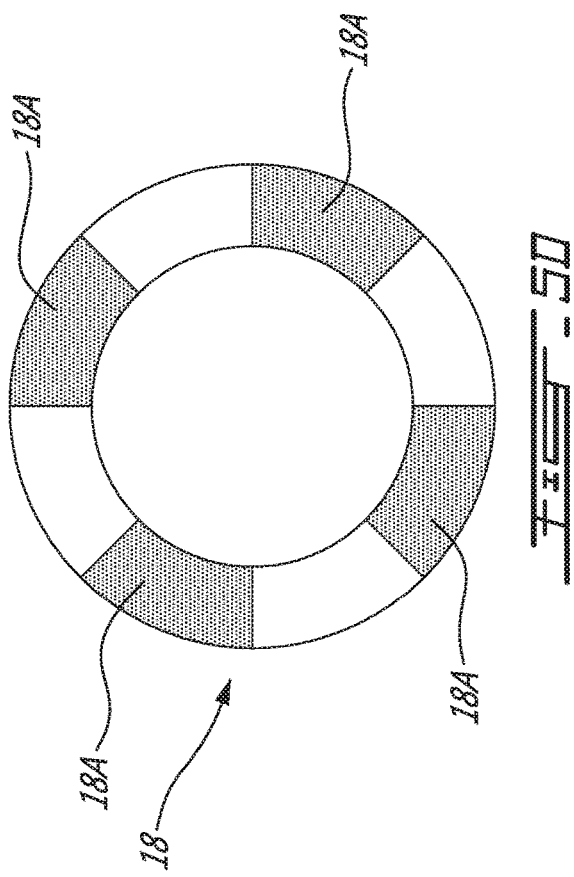

FIGS. 5A-5D are top views of exemplary inserts 18 of gasket 10 showing different configurations of contact faces 18A. It is understood that the configurations of contact faces 18A of FIGS. 5A-5D also apply to opposite contact faces 18B. Also, the configuration of contact faces 18B can be the same or different from the configuration of contact faces 18A. FIG. 5A shows contact face 18A being completely annular corresponding to the configuration of insert 18 shown in FIG. 3. FIG. 5B shows contact face 18A that is not completely annular but that defines at least a majority (e.g., defines a major arc portion) of an annulus. In other words, contact face 18A of FIG. 5B can have an angular extent about central axis CA that is greater than 180° but that is less than 360°. FIG. 5C shows two contact faces 18A that together cooperatively define at least a majority of an annulus. FIG. 5D shows a plurality of angularly spaced-apart contact faces 18A corresponding to the castellated configuration of insert 18 shown in FIG. 4. In various embodiments, contact faces 18A and/or 18B of insert 18 can be arcuate.

FIG. 6 is a schematic cross-sectional view of an exemplary assembly 20 including gasket 10. FIG. 6 shows the portion of gasket 10 shown in FIG. 2 installed and compressed between first component A and second component B. Assembly 20 can also include fastener 22 securing first and second components A and B together. Fastener 22 can extend through fastener hole 16 (shown in FIGS. 1 and 2) defined in gasket 10. In some embodiments, fastener 22 can be threaded. In some embodiments, fastener 22 can have fastener head 22A and fastener body 22B threaded into component B. Fastener 22 can be a bolt.

Fastener 22 can serve to clamp/secure component A and component B together with gasket 10 disposed therebetween. First and second contact faces 18A and 18B can serve as relatively large electrical (e.g., metal to metal) contact surface areas for establishing electrical continuity between components A and B. For example, insert 18 can provide an electrically conductive path P1 between component A and component B. The configuration of insert 18 can provide conductive path P1 the ability to carry relatively large currents (e.g., in the event of a lightning strike) and can also provide conductive path P1 the ability to carry high-frequency currents.

In some embodiments where fastener 22 is also electrically conductive, another electrically conductive path P2 between components A and B can be provided through fastener 22 via electrical (e.g., metal to metal) contact between fastener head 22A and component A, and via electrical (e.g., metal to metal) contact between fastener body 22B and component B. In some embodiments where the material of body 12 is also electrically conductive, a further electrical path (not shown) between components A and B can be provided via electrical contact between body 12 and component A, and via electrical contact between body 12 and component B. The electrical path between fastener 22 and the threaded hole formed on component B can be preserved by adding a oxide inhibiting compound (e.g., zinc & oil paste) sold under the tradename PENETROX to the threads of fastener 22 or by adding an environmental sealing feature to passage 18C of insert 18 such as a Nylon or other material able to seal the fastener threads from water ingress for example. The electrical path between insert 18 and components A and/or B can also be preserved by adding such oxide inhibiting compound to contact faces 18A and/or 18B.

In addition to providing a relatively robust electrical path P1 across gasket 10, insert 18 can also, in some embodiments, allow the compression of body 12 to be controlled to prevent over-compression of body 12 during installation of gasket 10. For example, insert 18 can be made of a material that is more rigid than the softer material of body 12 of gasket 10. In reference to FIG. 4, as fastener 22 is threaded into component B and torqued, the preloading of fastener 22 can exert a clamping force between component A, gasket 10 and component B. Such preloading of fastener 22 can cause compression (deformation) of the relatively soft material of body 12. The location of insert 18 in relation to components A and B and the greater rigidity of insert 18 can cause insert 18 to serve as a substantially hard stop that limits the compression of body 12 as fastener 22 is tightened. It is understood that in some embodiments, insert 18 could also undergo some deformation causing a change in height of insert 18. However, in embodiments where insert 18 is intended to limit the compression of body 12 and is more rigid than body 12, the change in height of insert 18 could be less than the change in height of body 12 during installation of gasket 10.

The difference between dimensions H1 and H2 can be selected based on a desired and acceptable amount of compression (deformation) of body 12. The difference between dimensions H1 and H2 can vary based on the types of materials of insert 18 and of body 12 in order to prevent over-compression and undesirable deformation of body 12. The difference between dimensions H1 & H2 can be selected so that the amount of gasket compression is proscribed and the amount of gasket extrusion, the amount of gasket clamping, friction and blow-out pressure resistance can be controlled.

Some existing conductive gaskets tend to lack the ampacity for some applications and also tend to suffer gasket extrusion under a clamping load either at the initial assembly, or after exposure to heat where the elastomeric materials can expand and soften at the same time. Another threat to some existing typical conductive gasket is the exposure to dynamic (e.g., cyclic) loads and heat where the gasket material (e.g., elastomer to polymer) softens and expands, but since the bolted joint load path is through the gasket, the dynamic loads can encourage the gasket to incrementally migrate out of position, to become more extruded out of the bolted joint. Consequently, when the system returns to ambient temperature, the preload of the bolted joint, the conductivity and the environmental seal provided by the joint can be compromised.

In some embodiments, the bolted joint illustrated in FIG. 6 can also have improved thermal stability. For example, gasket 10 can be compressed while maintaining a metal-to-metal bolted joint between fastener head 22A and component B via intermediate component A and insert 18. In this way, the bolted joint can include only metal components with relatively similar coefficients of thermal expansion as opposed to a bolted joint which would include the softer material of body 12.

As explained above, insert 18 can be integrated with gasket 10 and retained inside of fastener hole 16. However, in some embodiments, insert 18 or similar structure could instead be integrated with fastener 22.

FIG. 7 is a perspective exploded view of another exemplary assembly 200 including gasket 10. Gasket 10 can be installed and compressed between first component A and second component B. Component A can be a (e.g., electrical) receptacle and component B can be a piece of equipment that receives or outputs electrical power or electronic data signals via suitable conductors retained by the receptacle. In various embodiments of assembly 200, component B can be part (e.g., body, housing) of an actuator, valve, motor, electric generator or junction box for example. Assembly 200 can include threaded fasteners 22 and corresponding nuts 24 securing first and second components A and B together. Assembly 200 may be used in aerospace applications. For example, assembly 200 may be mounted to a gas turbine engine used as an aircraft engine. Component B can be a valve having an aluminum body and component A can be an electrical receptacle made of stainless steel that may be bare or coated with an electrically-conductive coating such as a nickel or a zinc-nickel coating for example. In some embodiments, contact faces 18A and or contact faces 18B of insert 18 that are in electrical contact with components A or B respectively can also have an electrically-conductive coating disposed thereon. Fasteners 22 can be made from stainless steel of a type known as "A-286" and can be uncoated.

Some electrical receptacles can have non-circular (e.g., oval, slotted, elongated) shaped fastener holes 26 for receiving fasteners 22 therethrough. In cases where component A is such an electrical receptacle, each insert 18 will not necessarily be fully covered by component A and could be exposed to various environmental conditions such as moisture and salt via holes 26 for example. In these cases, it could be desirable for inserts 18 to be made from a material or have a coating that is compatible with such environmental conditions. Also, inserts 18 should be made from a material that is suitable for bearing the applicable clamp load.

In embodiments where component B is an aluminum body, fasteners are bolts made of A-286 stainless steel and component A is a bare steel electrical receptacle, inserts 18 made of stainless steel may be suitable in some applications. In embodiments where component B is a chromated aluminum body and component A is made of stainless steel, inserts 18 made of tin plated brass may be suitable in some applications where such inserts also carry dynamic loading induced by vibration for example. Copper could be used as a material for inserts 18 in some applications where operating temperatures do not cause excessive softening of the insert material so as to compromise the clamping force requirement of the pre-loading of the bolted joint. In situations where gasket 10 is relatively thick, inserts 18 made of stainless steel could add significant electrical resistance and another material that is more electrically conductive such as nickel-plated brass may be preferable over stainless steel. It is understood that various material possibilities exist for inserts 18 depending on the specific application and environment in which gasket 10 is used.

In some embodiments, the use of gasket 10 can facilitate the integration of a receptacle/connector (i.e., component A) with an aerospace or other device (i.e., component B) in a manner that can simultaneously address several concerns (e.g., electrical conductivity, ampacity, material extrusion, corrosion, fluid sealing and loss of pre-load) associated with existing gaskets. In some embodiments, gasket 10 can be used in applications where it desirable that an electrical connector be mechanically secured, highly conductive to both low and very high frequency currents such as to withstand a proscribed lightning current fraction (e.g., 5,000 or 10,000 Amperes following a proscribed waveform which can be described as containing a very wide frequency spectrum) while providing corrosion resistance and a fluid seal.

In some embodiments of assembly 200, inserts 18 can transfer the mechanical load through several (e.g., four) points/locations similar to a pyramid by being spaced apart relatively far from each other in order to provide stable platform that can reduce or eliminate the potential of rocking of components A or B, squirming of body 12 and metal oxidation. Very high frequency currents can pass through the four fasteners 22 which, by virtue of being spaced very roughly along a circle, present a relatively low radio frequency (RF) impedance. The electrical paths provided by fasteners 22 can be additional (e.g., in parallel) with the electrical path(s) provided across body 12 of gasket 10 in cases where body 12 is impregnated or coated so as to also carry a significant amount of RF current as explained above. In some situations, large lightning or system fault currents can be mostly carried by fasteners 22 but can be shared by the material of body 12. Corrosion durability can be maintained by way of: gasket 10 sealing out fluids at the interface of components A and B; fasteners 22 being adequately sealed by application of a suitable compound (e.g., zinc paste); the system not mechanically squirming under mechanical stresses; and gasket 10 not being initially over-compressed and consequently not extruding out to failure at a later time. In some embodiments, gasket 10 can have a higher performance and a longer life compared to existing solutions.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A gasket for installation between a first and a second component, the gasket comprising:
    a body having a fastener hole extending therethrough, the fastener hole having a hole height corresponding to a thickness of the body in an uncompressed state; and
    an electrically conductive insert lining at least part of the fastener hole in the body, the insert having an insert height along the fastener hole of the body, the hole height being greater than the insert height, the insert having:
        a first contact face disposed for electrically contacting the first component;
        a second contact face disposed for electrically contacting the second component, the first contact face being in electrical communication with the second contact face; and
        a through passage extending from the first contact face to the second contact face for receiving a fastener through the body.

2. The gasket as defined in claim 1, wherein:
    the first contact face is annular; and
    the second contact face is annular.

3. The gasket as defined in claim 1, wherein the first contact face defines at least a majority of an annulus.

4. The gasket as defined in claim 1, wherein the insert defines an annular electrically conductive path extending between the first and second contact faces.

5. The gasket as defined in claim 1, wherein the insert is more rigid than the body.

6. The gasket as defined in claim 5, wherein the body is electrically conductive.

7. The gasket as defined in claim 1, wherein the body is overmolded to the insert.

8. The gasket as defined in claim 1, wherein the insert is metallic.

9. The gasket as defined in claim 1, wherein:
the first contact face is sunk below a first opening of the fastener hole in the body; and
the second contact face is substantially flush with a second opening of the fastener hole in the body.

10. The gasket as defined in claim 1, wherein the insert is more electrically conductive than the body.

11. The gasket as defined in claim 1, wherein the insert has a cross-sectional profile that is uniform between the first contact face and the second contact face.

12. An assembly comprising:
a first component;
a second component; and
a gasket disposed between the first and second components, the gasket having:
  a body having a fastener hole extending therethrough, the fastener hole having a hole height corresponding to a thickness of the body in an uncompressed state; and
  an electrically conductive insert lining at least part of the fastener hole in the body, the insert having an insert height along the fastener hole of the body, the hole height being greater than the insert height, the insert having:
    a first contact face electrically contacting the first component; and
    a second contact face electrically contacting the second component, the first contact face being in electrical communication with the second contact face.

13. The assembly as defined in claim 12, wherein the insert defines an annular electrically conductive path extending between the first and second contact faces.

14. The assembly as defined in claim 12, wherein the insert is more rigid than the body.

15. The assembly as defined in claim 12, wherein the body is electrically conductive.

16. The assembly as defined in claim 12, comprising a fastener securing the first and second components together, wherein:
the fastener extends through the fastener hole of the body;
a head of the fastener is in electrical contact with the first component;
the first component is in electrical contact with the insert; and
the insert is in electrical contact with the second component.

17. The assembly as defined in claim 12, wherein:
the first contact face is annular; and
the second contact face is annular.

18. The assembly as defined in claim 12, wherein the first component is an electrical receptacle.

* * * * *